Dec. 27, 1949  J. C. TRAVILLA, JR  2,492,337
RAILWAY TRUCK WITH LATERAL MOTION
Filed Nov. 19, 1947  4 Sheets-Sheet 1
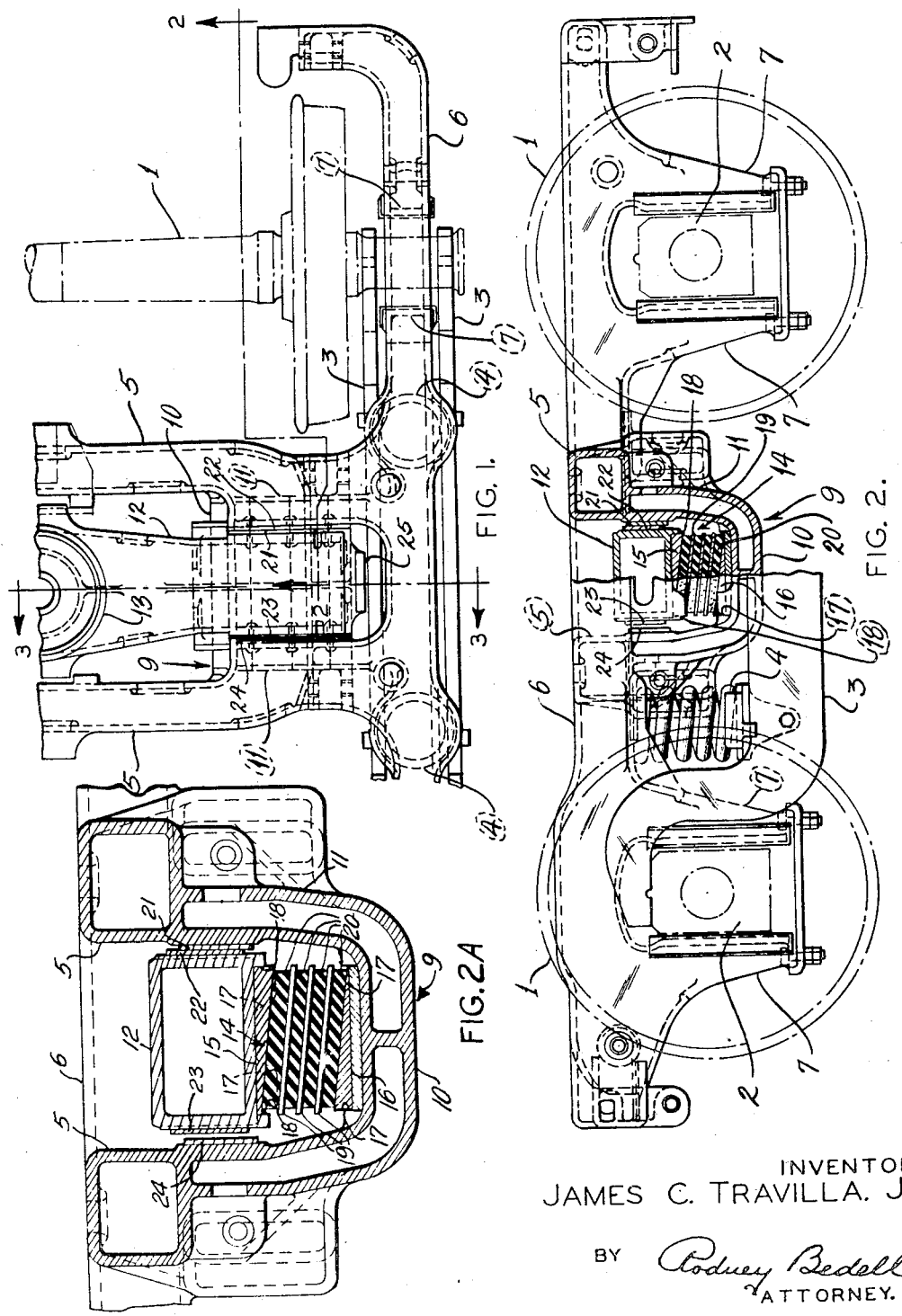
INVENTOR:
JAMES C. TRAVILLA. JR.
BY Rodney Bedell
ATTORNEY.

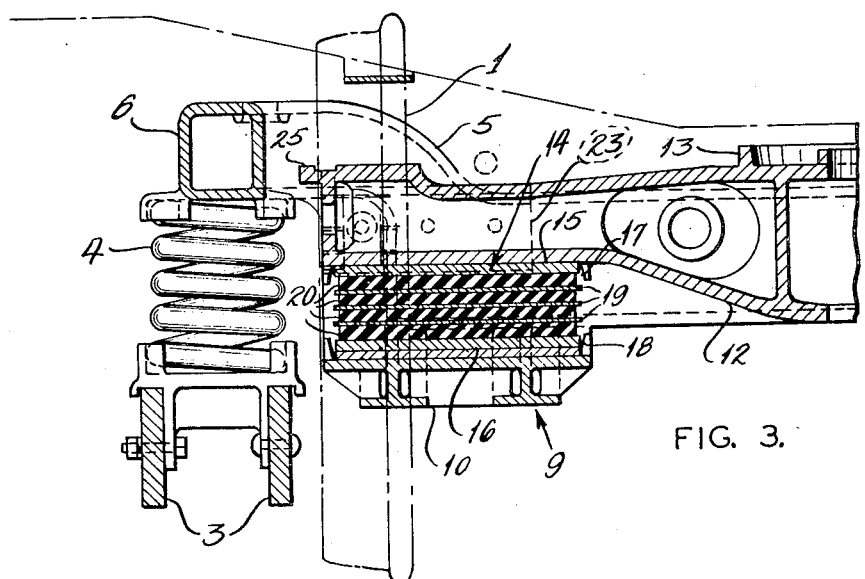
FIG. 3.
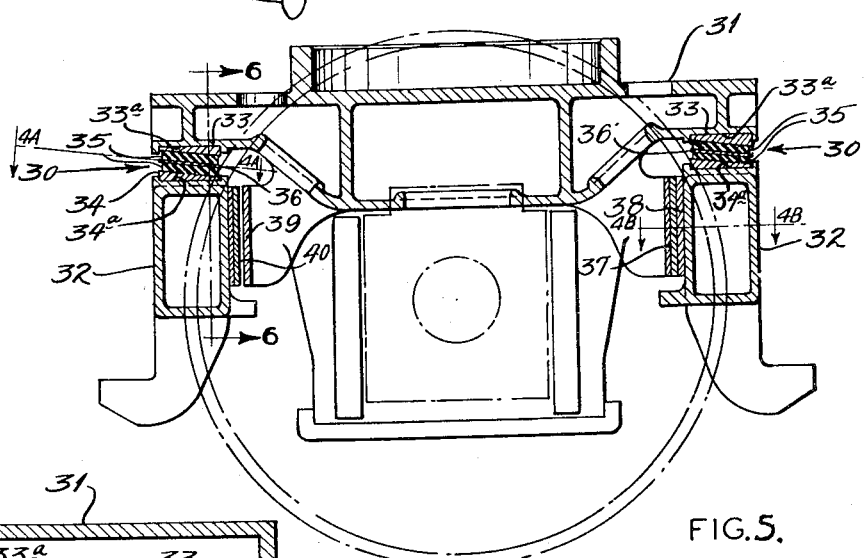
FIG. 5.
FIG. 6.
INVENTOR:
JAMES C. TRAVILLA, JR.
BY Rodney Bedell
ATTORNEY.

Dec. 27, 1949   J. C. TRAVILLA, JR   2,492,337
RAILWAY TRUCK WITH LATERAL MOTION
Filed Nov. 19, 1947   4 Sheets-Sheet 4

INVENTOR.
JAMES C. TRAVILLA, JR.
BY
Rodney Bedell

Patented Dec. 27, 1949

2,492,337

UNITED STATES PATENT OFFICE 2,492,337

RAILWAY TRUCK WITH LATERAL MOTION

James C. Travilla, Jr., Moylan, Pa., assignor to General Steel Castings Corporation, Granite City, Ill., a corporation of Delaware Application November 19, 1947, Serial No. 786,867

14 Claims. (Cl. 105—193)

1

The invention relates to railway trucks and particularly to the type having a separate bolster non-spring supported from the truck frame and providing for some lateral movement of the bolster relative to the truck frame. This application is a continuation in part of a copending application Serial No. 671,996, filed May 24, 1946 by the present inventor.

The invention is adapted for four-wheel or six-wheel trucks generally used in non-passenger carrying vehicles, including locomotives and express cars, where springs supporting the truck frame on the wheels and axles will offer sufficient spring action for the vehicle as distinguished from trucks for passenger carrying vehicles which usually include a spring support between the truck frame and bolster in addition to the spring support between the truck frame and the wheels and axles.

Trucks embodying separate bolsters, which are nonspring supported from the truck frame but provide for lateral movement, have been made previously with the bolster supported from the truck frame either by swing hangers or by rocker or roller centering devices, but some trouble has been experienced with such arrangements in controlling lateral movement of the bolster relative to the truck frame.

The main object of the present invention is to provide for relative lateral movement of the truck frame and bolster by means, other than that described briefly above, which will snub or damp such relative movement and will prevent resonant lateral oscillations and at the same time will center the bolster laterally in the frame and cushion vertical and longitudinal shocks between the bolster and truck frame.

Another object is to simplify and lighten the truck structure by using means for controlling lateral movement and cushioning vertical and longitudinal shocks which is simpler and of less weight than devices heretofore used.

Another object is to provide lateral bolster movement yet make the wheel base of both four-wheel and six-wheel trucks shorter than corresponding swing hanger type trucks by simplifying the structure to control lateral movement and by utilizing the space normally occupied by the bolster swing hangers for the brake hangers.

Another object is to reduce maintenance costs below that experienced with rockers, rollers or swing hangers.

The above objects are accomplished by using inclined yieldable pads of rubber or rubber-like material interposed between the truck frame and

2 bolster to urge the bolster longitudinally of the truck so that opposing wear plates on the truck frame and bolster, for limiting their relative movement longitudinally of the truck, normally engage one another and frictionally resist or snub lateral movement of the bolster relative to the truck frame.

The above and other detail objects as will appear below are attained by the structure illustrated in the accompanying drawings, in which—

Figure 1 is a top view of a portion of a longitudinal half of a four wheel railway truck embodying one form of the invention.

Figure 2 is in part a slide elevation and in part a longitudinal vertical section taken approximately on the line 2—2 of Figure 1.

Figure 2A is a detail longitudinal vertical section through both transoms duplicating generally the right hand portion of Figure 2 but drawn to enlarged scale.

Figure 3 is a transverse vertical section taken approximately on the line 3—3 of Figure 1 and drawn to enlarged scale.

Figure 5 is a detail longitudinal section taken approximately on the line 5—5 of Figure 4 and drawn to enlarged scale.

Figure 6 is a detail transverse vertical section taken approximately on the line 6—6 of Figure 5.

Figure 4:
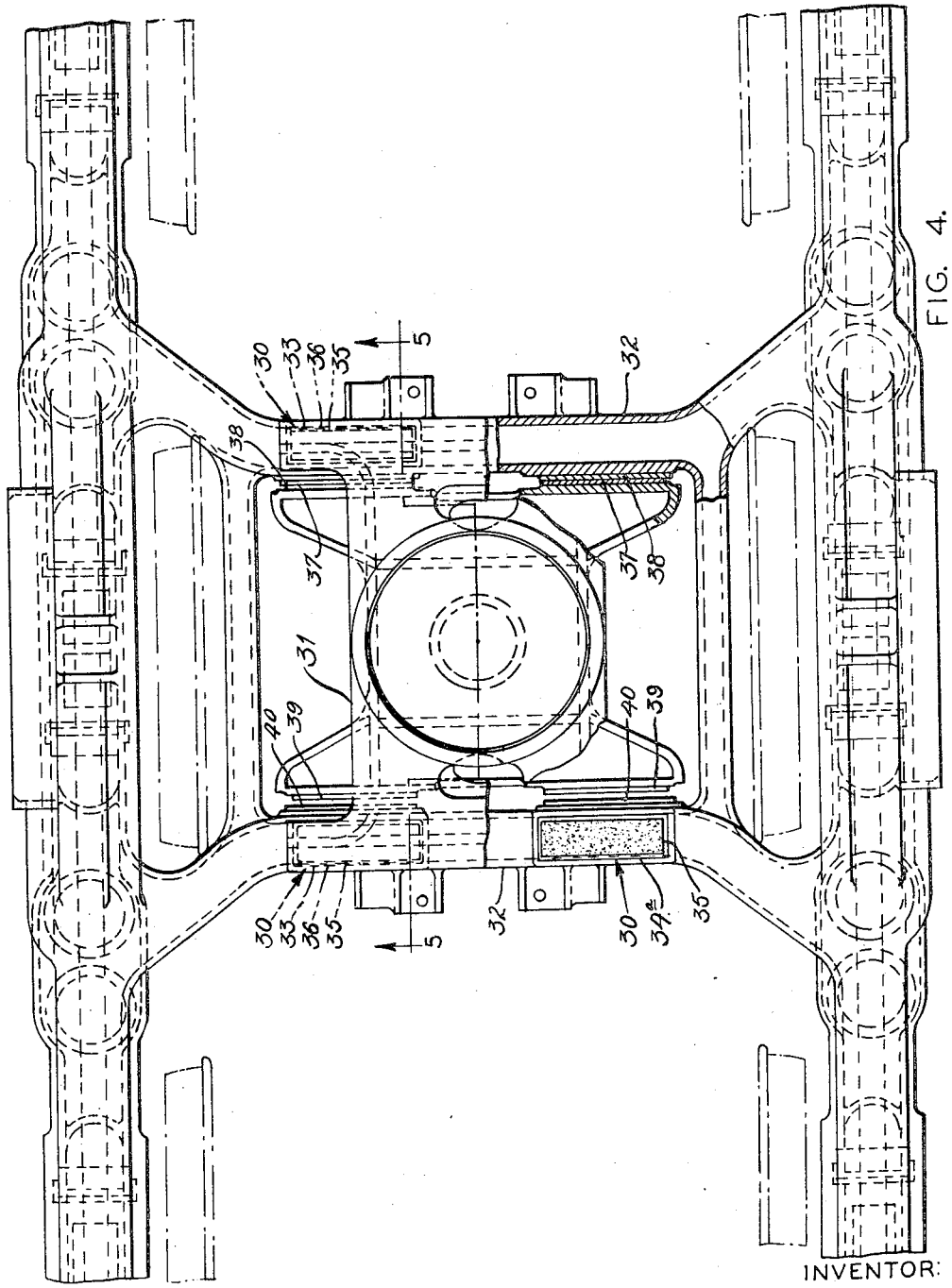
Figure 4 is a top view of a six wheel railway truck showing another form of the invention, portions of the truck being sectioned on the lines 4A—4A and 4B—4B of Figure 5 to better show the rubber pads for supporting the bolster and the bolster snubbing arrangement.

The four-wheel railway truck illustrated in Figures 1, 2, 2A and 3 comprises the usual wheel and axle assemblies 1, journal boxes 2, longitudinal equalizers 3 carried on the boxes, equalizer springs 4, a truck frame preferably consisting of a one-piece casting including transverse spaced transoms 5, and wheel pieces 6 with depending pedestal legs 7 receiving journal boxes 2 between them.

At each side of the truck, a downwardly extending U-shaped member 9, including a substantially horizontal portion 10 and substantially vertical portions 11, is formed integral with the truck frame and extends alongside each equalizer 3 and inwardly thereof from one transom 5 to the other. A bolster 12, mounting center plate structure 13, extends transversely of the truck and is supported at its ends by bolster mounting assemblies 14 mounted on horizontal portions 10 of members 9. Each assembly 14 includes steel wedges 15 and 16 positioned in opposite recesses 17 and 18 in bolster 12 and horizontal frame portions 10, respectively. Alternate steel plates 19 and yieldable pads 20, preferably of rubber or rubber-like material, are bonded together and the upper and lower pads 20 are bonded to wedges 15 and 16. Wedges 15 and 16 have opposing surfaces substantially parallel and inclined to the horizontal longitudinally of the truck so that the upper and lower faces of pads 20 are inclined to the horizontal in the same direction. Pads 20 are compressed between bolster 12 and horizontal portions 10 by the vertical load and improve the riding qualities of the truck. Assemblies 14 distort under shear to accommodate lateral and longitudinal movement of the bolster relative to the truck frame and to damp or snub such movement. The resistance of assemblies 14 to shear tend to center bolster 12 laterally of the truck whenever the bolster departs from normal position.

Bolster 12 and vertical portions 11 are provided with opposing pairs of wear plates 21 and 22, respectively, at one side of the bolster and opposing pairs of wear plates 23 and 24, respectively, at the other side of the bolster to limit movement of bolster 12 longitudinally of the truck frame. With yieldable pads 20 inclined downwardly from left to right at both ends of the bolster, as shown in Figures 2 and 2A, bolster 12 is urged forwardly towards the right-hand end of the truck and wear plates 21 and 22 engage each other except when longitudinal forces are applied to the bolster sufficient to overcome the effect of the inclination of the yieldable pads. The friction between wear plates 21 and 22, when abutting, further damps or resists lateral movement of bolster 12 relative to the truck frame in addition to the resistance to lateral movement by pads 20. Movement of bolster 12 laterally of the truck is limited by an outwardly extending flange 25 on each end of the bolster engaging the associated truck wheel pieces 6.

In the embodiment shown in Figures 4, 5, and 6, which is particularly adapted for six-wheel trucks, the bolster 31 overlies frame transoms 32 and bolster mounting assemblies 30 are positioned between the adjacent horizontal faces of the bolster and transoms, substantially at the four corners of the bolster. Assemblies 30 distort under shear to accommodate lateral and longitudinal movement of the bolster relative to the truck frame to damp or snub such movement and to center bolster 31 laterally of the truck.

Each assembly 30 comprises steel wedges 33 and 34 positioned in opposite recesses 33a and 34a in bolster 31 and transoms 32, respectively. The wedges are attached to yieldable pads 35, preferably of rubber or rubber-like material, bonded to an intermediate steel plate 36. Wedges 33 and 34 have opposing surfaces substantially parallel and inclined to the horizontal longitudinally of the truck, so that the upper and lower faces of yieldable pads 35 are inclined to the horizontal in the same direction. Pads 35 are compressed between bolster 31 and transoms 32 by the vertical load and improve the riding qualities of the truck.

Bolster 31 and transoms 32 are provided with opposing wear plates 37 and 38 at one side of the bolster and opposing wear plates 39 and 40 at the other side of the bolster to limit longitudinal movement of bolster 31 relative to the truck frame. With yieldable pads 35 inclined to the horizontal in the same direction at both sides of the bolster, as shown in Figure 5, bolster 31 is urged towards the right-hand end of the truck and forwardly positioned wear plates 37 and 38 engage each other except when longitudinal forces are applied sufficient to overcome the effect of the inclination of the yieldable pads. The friction between wear plates 37 and 38, when abutting, further damps or resists lateral movement of bolster 31 relative to the truck frame in addition to the resistance to lateral movement provided by pads 35.

As described above, the yieldable pads between the bolster and truck frame cushion longitudinal and vertical shocks and urge the bolster longitudinally towards one end of the truck so that the corresponding wear plates on the bolster and truck frame engage each other. The yieldable pads provide for lateral movement of the bolster relative to the truck frame and center the bolster laterally in the truck frame. Such lateral motion of the bolster is damped and resonant lateral oscillations of the bolster are prevented by the yieldable pads and by engagement of the corresponding wear plates on the bolster and truck frame.

Figure 7:
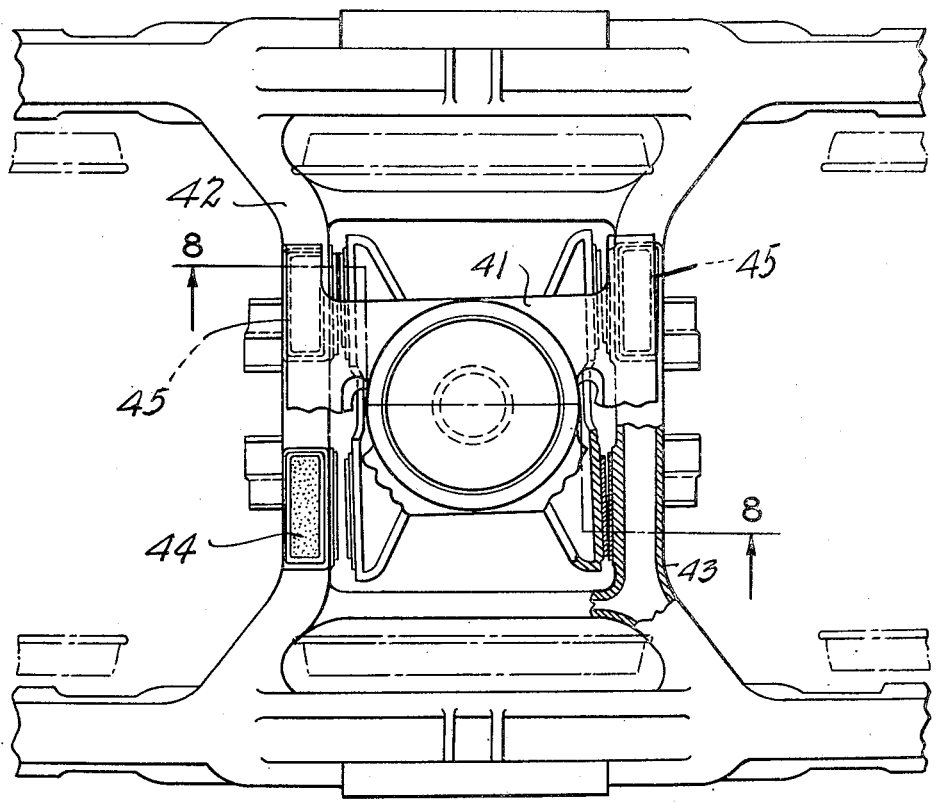
Figure 7 is a top view, sectioned in part, of a truck similar to that shown in Figure 4, but illustrating another form of the invention.
Figure 8:
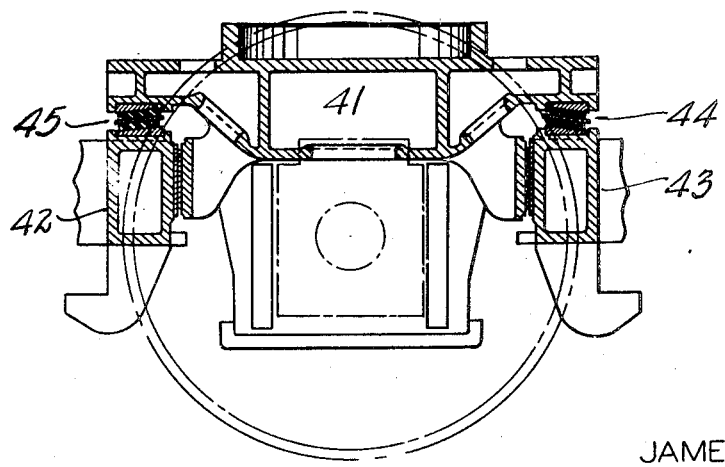
Figure 8 is a vertical section longitudinally of the truck taken on the line 8—8 of Figure 7.

Instead of inclining all of the yieldable pads in the same direction longitudinally of the truck so as to thrust the bolster towards one of the frame transoms, the pads may be inclined in one direction at one side of the truck and in the opposite direction at the other side of the truck to thrust the ends of the bolster in opposite directions longitudinally of the truck. Such an arrangement is shown in Figures 7 and 8, in which the bolster 41 lies between spaced transoms 42, 43. The pads 44 at one side of the truck are inclined to the horizontal as shown in the right hand side of Figure 8 and tend to thrust the corresponding end of the bolster towards transom 43 as indicated in Figure 7. The pads 45 at the other side of the truck are inclined in the opposite direction, as indicated at the left hand side of Figure 8, and tend to thrust the corresponding end of the bolster towards transom 42. With this arrangement the bolster normally will be in frictional contact with both transoms and always will be in frictional contact with at least one transom even though subjected to a force which would overcome the longitudinal thrust from the pads inclined in one direction. It will be understood that the bolster fits between the transoms much more closely than is shown in Figure 7 but that the spacing of the transoms and bolster and the inclination of the bolster from parallel relation with the transoms is exaggerated to better illustrate the feature described.

The structure to control lateral movement described may be used on either four or six-wheel trucks and the lightness, simplicity and compactness of the structure makes it possible to construct the trucks lighter and shorter than corresponding swing hangar type trucks because the space normally occupied by the swing hangers may be used for the brake parts, particularly the brake beam and brake heads.

The details of the construction may be varied substantially without departing from the spirit of the invention, and the exclusive use of such modifications as come within the scope of the claims is contemplated.

What is claimed is:

1. In a railway truck, a truck frame including bolster supporting portions, a bolster, and yieldable pads mounting said bolster on said portions and providing for limited movement of said bolster laterally of said truck frame and inclined to the horizontal longitudinally of the truck and normally urging said bolster longitudinally of said truck frame into frictional engagement therewith to snub lateral movement of said bolster.

2. In a railway truck, a truck frame including bolster supporting portions, a bolster, and yieldable pads mounting said bolster on said portions and providing for limited movement of said bolster relative to said truck frame laterally of the truck, said yieldable pads normally being inclined to the horizontal longitudinally of the truck to thrust said bolster yieldingly into frictional engagement with said truck frame longitudinally of the truck.

3. In a railway truck, a truck frame including rigid, substantially U-shaped members depending therefrom and extending longitudinally at the sides thereof, a bolster, and yieldable pads positioned at each end of said bolster and supporting the latter on said members and providing for limited movement of said bolster relative to said truck frame laterally of the truck, said pads being inclined to the horizontal longitudinally of the truck and normally thrusting said bolster towards upright parts of said truck frame longitudinally of the truck to damp movement of said bolster laterally of the truck.

4. In a railway truck, a truck frame including rigid substantially U-shaped members depending therefrom and extending longitudinally at the sides thereof, each of said members including a substantially horizontal portion, and a substantially vertical portion, a bolster, and yieldable pads positioned at each end of said bolster and supporting the latter from the horizontal portions of said members and providing for limited movement of said bolster relative to said truck frame laterally of the truck, said pads being inclined to the horizontal longitudinally of the truck and normally thrusting said bolster longitudinally of the truck into engagement with a vertical portion of each of said members to damp movement of said bolster laterally of the truck.

5. In a railway truck, a truck frame including rigid substantially U-shaped members depending therefrom and extending longitudinally at the sides thereof, each of said members including a substantially horizontal portion and a substantially vertical portion, a bolster, and yieldable pads positioned at each end of said bolster and supporting the latter from the horizontal portions of said members and providing for limited movement of said bolster relative to said truck frame laterally of the truck, wear plates on said bolster and on at least one of said vertical portions of each of said members, said pads being inclined to the horizontal longitudinally of the truck and normally thrusting the wear plates of said bolster longitudinally of the truck into engagement with the wear plates on said members to damp movement of said bolster laterally of the truck.

6. In a railway truck, a truck frame including rigid, substantially U-shaped members depending therefrom and extending longitudinally at the sides thereof, a bolster, and yieldable pads positioned at each end of said bolster and supporting the latter on said members and providing for limited movement of said bolster relative to said truck frame laterally of the truck, said pads being inclined to the horizontal longitudinally of the truck with all of their upper faces substantially parallel and normally thrusting said bolster in one direction longitudinally of the truck and toward upright parts of said truck frame to damp movement of said bolster laterally of the truck.

7. In a railway truck, spaced transoms, a bolster, and yieldable pads mounting said bolster on said transoms and providing for movement of said bolster relative to said transoms laterally of the truck, said yieldable pads being inclined to the horizontal longitudinally of the truck to yieldingly thrust the sides of the bolster toward adjacent transom portions.

8. In a railway truck, spaced transoms, a bolster, and yieldable pads mounting said bolster on said transoms and providing for movement of said bolster relative to said transoms laterally of the truck, said yieldable pads being inclined to the horizontal longitudinally of the truck to yieldingly thrust the bolster towards one of said transoms.

9. In a railway truck, spaced transoms, a bolster, and a yieldable pad substantially at each corner of said bolster mounting said bolster on said transoms and providing for limited movement of said bolster relative to said transoms transversely of the truck, said pads being inclined to the horizontal longitudinally of the truck with all of their upper faces substantially parallel.

10. Truck structure as described in claim 9 which includes wear plates on the bolster and at least one transom frictionally engaging each other to snub their relative movement transversely of the truck.

11. In a railway truck, spaced transoms, a bolster, a yieldable pad positioned substantially at each corner of said bolster and supporting the latter on said transoms and providing for limited movement of said bolster relative to said transoms laterally and longitudinally of the truck, there being wear plates on said bolster and transoms arranged for abutment to limit movement of said bolster relative to said transoms longitudinally of the truck, said pads being inclined to the horizontal longitudinally of the truck and being substantially parallel to each other and thrusting said bolster towards one of said transoms to bring the corresponding wear plates into contact with each other except when longitudinal forces are applied to the bolster sufficient to overcome the thrust of said pads.

12. In a railway truck, a truck frame including bolster supporting portions at opposite sides of the truck, a bolster, and yieldable pads mounting said bolster on said portions and providing for limited movement of said bolster relative to said truck frame laterally of the truck, the pad at one side of the truck being inclined to the horizontal in one direction longitudinally of the truck and the pad at the other side of the truck being inclined to the horizontal in the opposite direction longitudinally of the truck to thrust the ends of said bolster in opposite directions longitudinally of the truck and to thrust portions of the bolster into frictional engagement with said truck frame.

13. In a railway truck, a truck frame including bolster supporting portions, a bolster, and yieldable pads mounting said bolster on said portions and distorting in shear to provide for limited movement of said bolster laterally of said truck frame in response to lateral forces exerted in opposite directions on the bolster and truck frame, said pads being inclined from the horizontal longitudinally of said truck frame and normally being distorted in shear by the load thereon to urge said bolster longitudinally of said truck frame into frictional engagement therewith to snub lateral movement of said bolster.

14. In a railway truck, a frame including spaced transoms, a bolster supported by and extending between said transoms, said bolster and said transoms presenting opposing substantially horizontal and vertical faces, a yieldable pad positioned between the horizontal opposing faces of said bolster and said transoms and distorting in shear to provide for relative movement of said bolster and frame transversely of the truck and said pads being inclined to the horizontal longitudinally of the truck to thrust the vertical face of one side of said bolster against the opposing vertical face of the associated transom to snub relative movement of said bolster and said frame transversely of the truck.

JAMES C. TRAVILLA, JR.

REFERENCES CITED

The following references are of record in the file of this patent:

UNITED STATES PATENTS

| Number | Name | Date |
|---|---|---|
| 1,924,237 | Glascodine | Aug. 29, 1933 |
| 2,125,275 | Goodwin | Aug. 2, 1938 |
| 2,321,845 | Nystrom et al. | June 15, 1943 |